(12) United States Patent
Tanaka et al.

(10) Patent No.: US 7,569,267 B2
(45) Date of Patent: Aug. 4, 2009

(54) LAMINATE AND PRODUCTION PROCESS THEREOF

(75) Inventors: Hideaki Tanaka, Ibaraki (JP); Masahiro Yamazaki, Ibaraki (JP); Mototaka Kawashima, Ibaraki (JP)

(73) Assignee: Kureha Corporation, Tokyo (JP)

( * ) Notice: Subject to any disclaimer, the term of this patent is extended or adjusted under 35 U.S.C. 154(b) by 212 days.

(21) Appl. No.: 10/576,879

(22) PCT Filed: Oct. 20, 2004

(86) PCT No.: PCT/JP2004/015867

§ 371 (c)(1),
(2), (4) Date: Apr. 21, 2006

(87) PCT Pub. No.: WO2005/037534

PCT Pub. Date: Apr. 28, 2005

(65) Prior Publication Data

US 2007/0059518 A1    Mar. 15, 2007

(30) Foreign Application Priority Data

Oct. 22, 2003    (JP) .............................. 2003-362325

(51) Int. Cl.
*B32B 27/32* (2006.01)
*B32B 5/16* (2006.01)
*B32B 27/00* (2006.01)

(52) U.S. Cl. ...................... 428/220; 428/323; 428/328; 428/329; 428/330; 428/332; 428/500

(58) Field of Classification Search .............. None
See application file for complete search history.

(56) References Cited

U.S. PATENT DOCUMENTS

| | | | |
|---|---|---|---|
| 5,498,662 A | 3/1996 | Tanaka et al. | |
| 5,552,479 A | 9/1996 | Tanaka et al. | |
| 5,560,988 A | 10/1996 | Oba et al. | |
| 5,574,096 A | 11/1996 | Tanaka et al. | |
| 6,022,913 A | 2/2000 | Tanaka et al. | |
| 6,605,344 B1 * | 8/2003 | Ohba et al. | 428/332 |
| 6,699,830 B1 * | 3/2004 | Matsuo et al. | 510/475 |

FOREIGN PATENT DOCUMENTS

| | | |
|---|---|---|
| JP | 05-031404 | 1/1993 |
| JP | 05-262958 | 9/1993 |
| JP | 06-023735 | 1/1994 |
| JP | 06-194940 | 7/1994 |
| JP | 09-256216 | 9/1997 |
| JP | 11-104523 | 4/1999 |
| JP | 2002-098564 | 4/2002 |

OTHER PUBLICATIONS

"Engineering System of Fine Particles," vol. 1, p. 362-366, Fuji Technosystem (2001).
International Search Report.

* cited by examiner

*Primary Examiner*—Sheeba Ahmed
(74) *Attorney, Agent, or Firm*—Reed Smith LLP; Juan Carlos A. Marquez, Esq.

(57) ABSTRACT

A laminate having a layer structure that a carboxyl group-containing polymer layer (A) and a polyvalent metal compound-containing layer (B) are arranged adjacently to each other on at least one side of a polymeric base, wherein the polyvalent metal compound-containing layer (B) contains particles of a polyvalent metal compound, a binder resin and a surfactant, and a production process thereof.

21 Claims, 1 Drawing Sheet

LAMINATE AND PRODUCTION PROCESS THEREOF

TECHNICAL FIELD

The present invention relates to a laminate having a layer structure that a layer containing a carboxyl group-containing polymer typified by poly(meth)acrylic acid and a polyvalent metal compound-containing layer are arranged adjacently to each other on a polymeric base, and particularly to a laminate excellent in gas barrier property, moisture resistance, water resistance, hot water resistance and water vapor resistance and also excellent in gas barrier property under high-humidity conditions, to say nothing of low-humidity conditions. The present invention also relates to a production process of the laminate.

In the present invention, the laminate means a multi-layer structure that respective layers are formed by, for example, a coating method, lamination method, vapor deposition method or a combined method thereof. In the present invention, a film means not only a film having a thickness smaller than 0.25 mm, but also a sheet having a thickness not smaller than 0.25 mm. Further, in the present invention, poly(meth) acrylic acid means polyacrylic acid or polymethacrylic acid, or a mixture thereof.

BACKGROUND ART

A polyvinyl alcohol film is excellent in gas barrier property, but insufficient in moisture resistance and water resistance and has great dependence of gas barrier property on humidity. Therefore, this film tends to markedly lower its gas barrier property depending on humidity. An ethylene-vinyl alcohol copolymer film is relatively good in gas barrier property and water resistance, but has great dependence of gas barrier property on humidity. A poly(meth)acrylic acid film exhibits excellent gas barrier property under dry conditions such as a relative humidity of 0%, but is poor in moisture resistance, water resistance, hot water resistance and water vapor resistance. In particular, its gas barrier property is markedly deteriorated under high-humidity conditions.

There have heretofore been proposed processes for providing a film excellent in gas barrier property, water resistance and hot water resistance and little in dependence of gas barrier property on humidity by subjecting a coating film formed from a mixture of poly(meth)acrylic acid or a partially saponified product thereof and polyvinyl alcohol or a saccharide to a heat treatment (for example, Japanese Patent Nos. 2736600, 2811540, 3203287 and 3340780).

In the gas barrier films obtained by these processes, an ester bond is formed between poly(meth)acrylic acid or the partially neutralized product thereof and polyvinyl alcohol or the saccharide by the heat treatment, and so such films undergo crosslinking (referred to as "ester crosslinking") at a high level.

In order to further improve the gas barrier films obtained in accordance with the processes described in the above 4 documents, there has been proposed a process for introducing an ionic bond by a metal ion in addition to the ester bond.

There has been proposed, for example, a process for introducing an ionic bond between poly(meth)acrylic acid and a metal by subjecting a coating film formed of a mixture of poly(meth)acrylic acid and polyvinyl alcohol or a saccharide to a heat treatment to form a film and then subjecting the film to a dipping treatment in a medium containing an alkali metal or alkaline earth metal (for example, Japanese Patent Application Laid-Open No. 10-237180).

According to the process described in Japanese Patent Application Laid-Open No. 10-237180, a gas barrier film improved in hot water resistance and water vapor resistance can be produced. However, this process requires to subject the heat-treated film to a dipping treatment over a relatively long period of time at a high temperature of, for example, about 90 to 130° C. in a medium such as an aqueous solution containing a metal compound or metal ion.

There has also been proposed a process in which a metal compound layer is formed on the surface of a coating film formed from a mixture of poly(meth)acrylic acid or a partially neutralized product thereof and polyvinyl alcohol or a saccharide to form an ionic bond by migration of a metal compound into the coating film (for example, Japanese Patent Application Laid-Open No. 2000-931). In the coating film, an ester bond is formed between poly(meth)acrylic acid or the partially saponified product thereof and polyvinyl alcohol or the saccharide by a heat treatment.

According to the above process of forming the metal compound layer on the coating film, an ionic bond is formed in the coating film by a solid phase reaction by the migration of a metal ion from the metal compound layer, whereby a film far excellent in gas barrier property, hot water resistance and water vapor resistance can be produced. Into the gas barrier film in accordance with this process, an ionically crosslinked structure by an ionic bond between the carboxyl group and the metal ion is introduced in addition to a crosslinked structure by the ester bond formed by the heat treatment.

When a layer of a mixture containing a polyvalent metal compound and a resin is used as the metal compound layer in the process described in Japanese Patent Application Laid-Open No. 2000-931, a multi-layer film excellent in interlayer adhesive property can be obtained. In such a case, it has been desired to sufficiently enhance migration efficiency of a polyvalent metal ion.

In the above process, it is further necessary to form a crosslinked structure by an ester bond between poly(meth) acrylic acid or the partially saponified product thereof and polyvinyl alcohol or the saccharide. When no ester bond is formed, the hot water resistance and water vapor resistance of the resulting multi-layer film are deteriorated by the presence of polyvinyl alcohol or the saccharide that is not crosslinked by the ester bond. The formation of the ester bond requires to heat-treat the coating film having the above-described composition under high-temperature conditions. In addition, the multi-layer film obtained by such a process is difficult to scrap or regenerate because the film has the strong crosslinked structure by the ester bond.

There has thus been a demand for developing a process for providing a multi-layer film excellent in gas barrier property, which is applicable to not only the case where an ester bond is formed, but also the case no ester bond is formed, from the viewpoints of application fields, scrap handling, regeneration treatment and the like.

DISCLOSURE OF THE INVENTION

It is an object of present invention to provide a laminate comprising a polymer layer obtained by ionically crosslinking a carboxyl group-containing polymer with a polyvalent metal and having excellent gas barrier property, moisture resistance, water resistance, hot water resistance and water vapor resistance and also having excellent gas barrier property under high-humidity conditions, to say nothing of low-humidity conditions.

It is particularly an object of the present invention to provide a laminate having a layer structure that a carboxyl group-containing polymer layer and a polyvalent metal compound-containing layer are arranged adjacently to each other on at least one side of a polymeric base, said laminate being excellent in the migration property of polyvalent metal compound particles from the polyvalent metal compound-containing layer.

It is also an object of the present invention to provide a laminate to which excellent gas barrier property, moisture resistance, water resistance, hot water resistance and water vapor resistance are imparted by virtue of ionic crosslinking alone by a polyvalent metal even when a carboxyl group-containing polymer layer does not always contain a crosslinking agent component (for example, polyvinyl alcohol or a saccharide)

It is further an object of the present invention to provide a process for producing a laminate having such various properties as described above.

The present inventors have carried out an extensive investigation with a view toward achieving the above objects. As a result, it has been found that a film excellent in gas barrier property, moisture resistance, water resistance, hot water resistance and water vapor resistance and also excellent in gas barrier property under high-humidity conditions, to say nothing of low-humidity conditions, can be obtained by ionically crosslinking a carboxyl group-containing polymer such as poly(meth)acrylic acid with a polyvalent metal.

More specifically, a carboxyl group-containing polymer layer is formed on at least one side of a polymeric base, and a polyvalent metal compound-containing layer is arranged adjacently to one side or both sides of the carboxyl group-containing polymer layer to form a laminate. At this time, when a mixture comprising particles of a polyvalent metal compound, a binder resin and a surfactant is used to form the polyvalent metal compound-containing layer, the migration of the polyvalent metal compound particles into the carboxyl group-containing polymer layer can be allowed to progress with good efficiency to efficiently obtain a laminate excellent in gas barrier property.

When no crosslinking agent is contained in the carboxyl group-containing polymer layer, the carboxyl group-containing polymer layer is crosslinked by an ionic bond alone. Since such a carboxyl group-containing polymer layer is neither dissolved in nor deformed by water, hot water, water vapor and the like under ordinary service conditions, but dissolved in strongly acidic or alkaline water, the laminate can be easily scrapped or regenerated. Of course, it may be allowed to contain a crosslinking component in the carboxyl group-containing polymer layer, as needed, so as to introduce another crosslinked structure by an ester bond or the like than the ionic crosslinking. The present invention has been led to completion on the basis of these findings.

According to the present invention, there is provided a laminate having a layer structure that a carboxyl group-containing polymer layer (A) and a polyvalent metal compound-containing layer (B) are arranged adjacently to each other on at least one side of a polymeric base, wherein the polyvalent metal compound-containing layer (B) contains particles of a polyvalent metal compound, a binder resin and a surfactant.

According to the present invention, there is also provided a process for producing a laminate having a layer structure that a carboxyl group-containing polymer layer (A) and a polyvalent metal compound-containing layer (B) are arranged adjacently to each other on at least one side of a polymeric base, the process comprising (1) Step 1 of applying a coating liquid comprising a carboxyl group-containing polymer on to said at least one side of the polymeric base to dry it, thereby forming the carboxyl group-containing polymer layer (A) and (2) Step 2 of applying a coating liquid comprising particles of a polyvalent metal compound, a binder resin and a surfactant before or after Step 1 to dry it, thereby forming the polyvalent metal compound-containing layer (B).

BEST MODE FOR CARRYING OUT THE INVENTION

Figure 1:
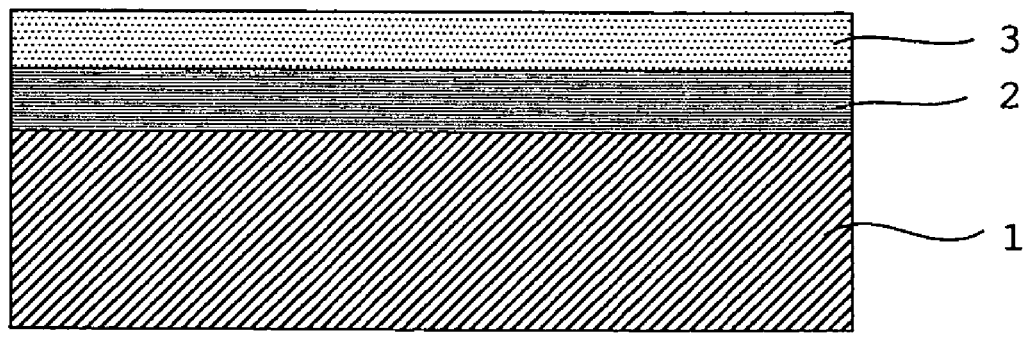
FIG. 1 is a cross-sectional view illustrating an exemplary layer structure of a multi-layer film.

1. Polymeric Base:

No particular limitation is imposed on a material of the polymeric base used in the present invention, and various kinds of polymers may be used. The form of the base is generally that having a flat surface, such as a film or sheet (hereinafter referred to as "film" merely), or plate. However, the base may be a container such a bottle, cap, tray or bag, or any other base having a stereostructure, if desired.

As the base, is preferably used a plastic film. No particular limitation is imposed on the kind of a plastic forming the plastic film, and the kinds include thermoplastic resins and thermosetting resins. As examples thereof, may be mentioned olefin polymers such as high density polyethylene, medium density polyethylene, low density polyethylene, linear low density polyethylene, polypropylene, poly(4-methylpentene) and cyclic polyolefins, and acid-modified products thereof; vinyl acetate polymers such as polyvinyl acetate, ethylene-vinyl acetate copolymers, saponified products of ethylene-vinyl acetate copolymers and polyvinyl alcohol, and modified products thereof; polyesters such as polyethylene terephthalate, polybutylene terephthalate and polyethylene naphthalate; aliphatic polyesters such as poly($\epsilon$-caprolactone), polyhydroxybutyrate and polyhydroxyvalerate; polyamides such as nylon 6, nylon 66, nylon 12, nylon 6/66 copolymers, nylon 6/12 copolymers and meta-xyleneadipamide.nylon 6 copolymers; polyethers such as polyethylene glycol, poly(ether sulfone), poly(phenylene sulfide) and poly(phenylene oxide); halogenated polymers such as polyvinyl chloride, polyvinylidene chloride, polyvinyl fluoride and polyvinylidene fluoride; acrylic polymers such as polymethyl acrylate, polyethyl acrylate, polymethyl methacrylate, polyethyl methacrylate and polyacrylonitrile; polyimide resins; and besides binder resins for paints, such as alkyd resins, melamine resins, acrylic resins, pyroxylin, urethane resins, polyester resins, phenol resins, amino resins, fluorocarbon resins and epoxy resins; and natural polymeric compounds such as cellulose, starch, pullulan, chitin, chitosan, glucomannan, agarose and gelatin.

The polymeric base is preferably an unoriented film or oriented film formed of any one of these plastics. However, a container formed of any one of these plastics, such as a bottle, cup, tray or bag, may also be used as the polymeric base if desired.

As the polymeric base, may also be used that obtained by forming a thin film of an inorganic compound such as silicon oxide, aluminum oxide, aluminum or silicon nitride; a metal compound; or the like on the surface of a plastic film or container by a vapor deposition method sputtering method or ion plating method. The thin films formed of these inorganic compounds or metal compounds are generally used for the purpose of imparting gas barrier property.

2. Carboxyl Group-Containing Polymer:

The carboxyl group-containing polymer used in the present invention is a polymer having at least 2 carboxyl groups in its molecule and may be called "polycarboxylic acid polymer" in some cases. Typical examples of the carboxyl group-containing polymer include homopolymers of carboxyl group-containing unsaturated monomers, copolymers of carboxyl group-containing unsaturated monomers, copolymers of a carboxyl group-containing unsaturated monomer and any other polymerizable monomer, and polysaccharides (also referred to as "acid polysaccharides") containing a carboxyl group in their molecules.

The carboxyl group includes not only a free carboxyl group, but also an acid anhydride group (specifically, dicarboxylic acid anhydride group). The acid anhydride group may undergo partial ring opening to form a carboxyl group. A part of the carboxyl group may be neutralized with an alkali hydroxide such as sodium hydroxide, lithium hydroxide or potassium hydroxide, or a volatile base such as ammonia. In this case, the degree of neutralization is preferably at most 20%.

A graft polymer obtained by graft-polymerizing a carboxyl group-containing unsaturated monomer on a polymer containing no carboxyl group, such as a polyolefin, may also be used as the carboxyl group-containing polymer. A polymer obtained by hydrolyzing a polymer having a hydrolyzable ester group such as an alkoxycarbonyl group (for example, methoxycarbonyl group) to convert the ester group into a carboxyl group may also be used as the carboxyl group-containing polymer.

As the carboxyl group-containing unsaturated monomer, is preferred an $\alpha,\beta$-monoethylenically unsaturated carboxylic acid. Accordingly, examples of the carboxyl group-containing polymer include homopolymers of $\alpha,\beta$-monoethylenically unsaturated carboxylic acids, copolymers of 2 or more $\alpha,\beta$-monoethylenically unsaturated carboxylic acids, and copolymers of an $\alpha,\beta$-monoethylenically unsaturated carboxylic acid and any other polymerizable monomer. Ethylenically unsaturated monomers are representative of other polymerizable monomers.

Examples of the $\alpha,\beta$-monoethylenically unsaturated carboxylic acids include unsaturated monocarboxylic acids such as acrylic acid, methacrylic acid and crotonic acid; unsaturated dicarboxylic acids such as maleic acid, fumaric acid and itaconic acid; unsaturated dicarboxylic acid anhydrides such as maleic anhydride and itaconic anhydride; and mixtures of 2 or more compounds thereof. Among these, at least one $\alpha,\beta$-monoethylenically unsaturated carboxylic acid selected from the group consisting of acrylic acid, methacrylic acid, crotonic acid, maleic acid, fumaric acid and itaconic acid is preferred, with at least one $\alpha,\beta$-monoethylenically unsaturated carboxylic acid selected from the group consisting of acrylic acid, methacrylic acid and maleic acid being more preferred.

As examples of the other polymerizable monomers copolymerizable with the $\alpha,\beta$-monoethylenically unsaturated carboxylic acid, particularly, ethylenically unsaturated monomers, may be mentioned $\alpha$-olefins such as ethylene, propylene, 1-butene, 1-pentene, 1-hexene and 1-octene; vinyl esters of saturated carboxylic acids, such as vinyl acetate; alkyl esters of acrylic acid, such as methyl acrylate and ethyl acrylate; alkyl esters of methacrylic acid, such as methyl methacrylate and ethyl methacrylate; chlorine-containing vinyl monomers such as vinyl chloride, vinylidene chloride; fluorine-containing vinyl monomers such as vinyl fluoride and vinylidene fluoride; unsaturated nitriles such as acrylonitrile and methacrylonitrile; aromatic vinyl monomers such as styrene and $\alpha$-methyl-styrene; and alkyl esters of itaconic acid.

These ethylenically unsaturated monomers may be used either singly or in any combination thereof. When the carboxyl group-containing polymer is a copolymer of an $\alpha,\beta$-monoethylenically unsaturated carboxylic acid and a vinyl ester of a saturated carboxylic acid, such as vinyl acetate, a copolymer obtained by saponifying the copolymer to convert the saturated carboxylic acid vinyl ester unit into a vinyl alcohol unit may also be used.

As examples of the carboxyl group-containing polysaccharides, may be mentioned acid polysaccharides having a carboxyl group in their molecules, such as alginic acid, carboxymethyl cellulose and pectin. These acid polysaccharides may be used either singly or in any combination thereof. The acid polysaccharide may also be used in combination with a (co)polymer of an $\alpha,\beta$-monoethylenically unsaturated carboxylic acid. The term "(co)polymer" as used herein means a homopolymer or copolymer, or a mixture thereof.

When the carboxyl group-containing polymer used in the present invention is a copolymer of an $\alpha,\beta$-monoethylenically unsaturated carboxylic acid and any other ethylenically unsaturated monomer, the copolymerization composition thereof is such that the $\alpha,\beta$-monoethylenically unsaturated carboxylic acid monomer composition is preferably at least 60 mol %, more preferably at least 80 mol %, particularly preferably at least 90 mol % from the viewpoints of the gas barrier property, hot water resistance and water vapor resistance of the resulting film.

The carboxyl group-containing polymer is preferably a homopolymer or copolymer obtained by polymerization of the $\alpha,\beta$-monoethylenically unsaturated carboxylic acid(s) alone in that a film excellent in gas barrier property, moisture resistance, water resistance, hot water resistance and water vapor resistance and also excellent in gas barrier property under high-humidity conditions is easily obtained.

When the carboxyl group-containing polymer is a (co)polymer composed of the $\alpha,\beta$-monoethylenically unsaturated carboxylic acid(s) alone, specific preferable examples thereof include homopolymers and copolymers obtained by polymerization of at least one $\alpha,\beta$-monoethylenically unsaturated carboxylic acid selected from the group consisting of acrylic acid, methacrylic acid, crotonic acid, maleic acid, fumaric acid and itaconic acid, and mixtures of at least two polymers thereof. Among these, homopolymers and copolymers obtained by polymerization of at least one $\alpha,\beta$-monoethylenically unsaturated carboxylic acid selected from the group consisting of acrylic acid, methacrylic acid and maleic acid are more preferred.

Particularly preferable examples of the carboxyl group-containing polymer include polyacrylic acid, polymethacrylic acid, polymaleic acid and mixtures of at least two polymers thereof. As the acid polysaccharide, is preferred alginic acid. Among these, polyacrylic acid is particularly preferred in that it is relatively easily available, and a film excellent in various properties is easily obtained.

No particular limitation is imposed on the molecular weight of the carboxyl group-containing polymer. However, its number average molecular weight is preferably within a range of 2,000 to 10,000,000, more preferably within a range of 5,000 to 1,000,000, still more preferably within a range of 10,000 to 500,000 from the viewpoints of film-forming ability and the physical properties of the resulting film. The number average molecular weight can be measured by gel permeation chromatography (GPC). In the measurement by GPC, the number average molecular weight of the polymer is generally measured in terms of standard polystyrene.

Besides the carboxyl group-containing polymer, other polymers may be mixed and used as polymers making up the film according to the present invention within limits not impeding the properties of the film, such as gas barrier property, hot water resistance and water vapor resistance. In many cases, it is preferable to use the carboxyl group-containing polymer alone.

The carboxyl group-containing polymer used as a raw material is desired to have an oxygen transmission coefficient of preferably at most 1,000 $cm^3 \cdot \mu m/(m^2 \cdot day \cdot MPa)$, more preferably at most 500 $cm^3 \cdot \mu m/(m^2 \cdot day \cdot MPa)$, particularly preferably at most 100 $cm^3 \cdot \mu m/(m^2 \cdot day \cdot MPa)$ as determined in the form of a film formed by itself under dry conditions of a temperature of 30° C. and a relative humidity of 0%. If the oxygen transmission coefficient of the carboxyl group-containing polymer used as a raw material is too low, the resulting laminate according to the present invention tends to exhibit insufficient gas barrier property and stability to hot water and water vapor (hot water resistance and water vapor resistance).

The oxygen transmission coefficient of the carboxyl group-containing polymer used as a raw material can be determined in accordance with the following method. The carboxyl group-containing polymer is dissolved in water to prepare an aqueous solution of a concentration of 10% by weight. This aqueous solution is applied on to a plastic film base by means of a bar coater and dried, thereby producing a coated film with a carboxyl group-containing polymer layer having a dry thickness of 1 μm formed thereon. With respect to the coated film thus obtained, its oxygen transmission rate is measured under conditions of 30° C. and relative humidity of 0%. As the plastic film base, is used a plastic film having a relatively high oxygen transmission rate. When the oxygen transmission rate of the resultant coated film having the dry coating film of the carboxyl group-containing polymer is at most a tenth of the oxygen transmission rate of the single plastic film used as the base, the measured value of the oxygen transmission rate can be substantially regarded as the oxygen transmission rate of the carboxyl group-containing polymer layer alone.

Since the measured value obtained in the above-described manner is a value of the oxygen transmission rate of the carboxyl group-containing polymer layer having a thickness of 1 μm, it can be transformed into an oxygen transmission coefficient by multiplying the measured value by 1 μm. The oxygen transmission rate can be measured by means of, for example, an oxygen transmission tester "OXTRAN 2/20" manufactured by Modern Control Co. The measuring method of the oxygen transmission rate is carried out in accordance with ASTM D 3985-81 [corresponding to the B method (equal pressure method) prescribed in JIS K 7126]. The measured value can be indicated by unit $cm^3(STP)/(m^2 \cdot day \cdot MPa)$. Since STP means standard conditions (0° C., 1 atm) for defining the volume of oxygen, the unit may be indicated by omitting STP.

In the present invention, the carboxyl group-containing polymer alone may be used to form the carboxyl group-containing polymer layer (A). However, a crosslinking agent component capable of crosslinking the carboxyl group-containing polymer may be used as needed.

As examples of the crosslinking agent, may be mentioned polyhydric alcohols such as polyvinyl alcohol, polysaccharides and glycerol; diisocyanate compounds, diepoxy compounds, and carbodiimide compounds. The crosslinking agent is contained in the coating liquid comprising the carboxyl group-containing polymer upon the formation of the carboxyl group-containing polymer layer (A) to use it. The crosslinking treatment may be carried out by applying the coating liquid comprising the carboxyl group-containing polymer and crosslinking agent, drying it and then heat-treating the resultant coating film.

When a polyhydric alcohol such as polyvinyl alcohol or a saccharide is used as the crosslinking agent, the above-described 6 patent documents may be referred to for the kind and proportion of the polyhydric alcohol used, conditions of crosslinking by the heat treatment, etc. For example, the proportion of the carboxyl group-containing polymer to the polyhydric alcohol is generally 5:95 to 90:10 in terms of a weight ratio. With respect to the conditions of the heat treatment for forming the ester crosslinking, the heating temperature is generally at least 100° C., preferably 100 to 300° C., more preferably 160 to 230° C., and the time for the heat treatment is generally for from 30 seconds to 48 hours, preferably for from 1 minute to 24 hours, more preferably for from 5 minutes to 1 hour.

The carboxyl group-containing polymer itself may also be crosslinked by active energy rays such as electron rays or ultraviolet rays. In this case, the coating liquid comprising the carboxyl group-containing polymer is applied and dried, and the coating film thus obtained is irradiated with the active energy rays to form a crosslinked structure.

3. Polyvalent Metal Compound:

The polyvalent metal compound particles used in the present invention are particles of a simple substance of a polyvalent metal atom, whose metal ion has a di or higher valence, or particles of a polyvalent metal compound. Accordingly, polyvalent metal compounds used in the present invention also include simple substances of polyvalent metal atoms.

As specific examples of polyvalent metals, may be mentioned metals of Group 2A of the periodic table, such as beryllium, magnesium and calcium; transition metals such as titanium, zirconium, chromium, manganese, iron, cobalt, nickel, copper and zinc; and aluminum. However, the polyvalent metals are not limited thereto.

Specific examples of the polyvalent metal compounds include oxides, hydroxides, carbonates, organic acid salts and inorganic acid salts of the polyvalent metals. However, the polyvalent metal compounds are not limited thereto.

Examples of the organic acid salts include acetates, oxalates, citrates, lactates, phosphates, phosphites, hypophosphites, stearates and monoethylenically unsaturated monocarboxylates. However, the organic acid salts are not limited thereto. Examples of the inorganic acid salts include chlorides, sulfates and nitrates. However, the inorganic acid salts are not limited thereto. Alkylalkoxides of polyvalent metals may also be used as the polyvalent metal compounds. These polyvalent metal compounds may be used either singly or in any combination thereof.

Among the polyvalent metal compounds, compounds of beryllium, magnesium, calcium, copper, cobalt, nickel, zinc, aluminum and zirconium are preferred from the viewpoints of dispersion stability in a coating liquid and the gas barrier property of a multi-layer film to be formed, with compounds of divalent metals such as beryllium, magnesium, calcium, copper, zinc, cobalt and nickel being more preferred.

As preferable examples of divalent metal compounds, may be mentioned oxides such as zinc oxide, magnesium oxide, copper oxide, nickel oxide and cobalt oxide; carbonates such as calcium carbonate; organic acid salts such as calcium lactate, zinc lactate and calcium acrylate; and alkoxides such as magnesium methoxide. However, the divalent metal compounds are not limited thereto.

The polyvalent metal compound-containing layer (B) is generally formed by applying a coating liquid comprising the polyvalent metal compound particles, a binder resin and a surfactant and drying it. The polyvalent metal compound is used in the form of particles. The particle form thereof is retained even in the polyvalent metal compound-containing layer, to say nothing of in the coating liquid.

It is desirable from viewpoints of the dispersion stability of the coating liquid and the migration property of the polyvalent metal compound particles that the average particle diameter of the polyvalent metal compound particles be preferably within a range of 10 nm to 10 µm (10,000 nm), more preferably within a range of 12 nm to 1 µm (1,000 nm), still more preferably within a range of 15 to 500 nm, particularly preferably within a range of 15 to 50 nm.

If the average particle diameter of the polyvalent metal compound particles is too large, the uniformity of film thickness, surface smoothness, ionic crosslinking reactivity with the carboxyl group-containing polymer, and the like of the resulting coating film are liable to become insufficient. If the average particle diameter of the polyvalent metal compound particles is too small, there is a possibility that the ionic crosslinking reaction with the carboxyl group-containing polymer may progress prematurely. In addition, it is difficult to uniformly disperse ultrafine particles smaller than 10 nm in that state.

The average particle diameter of the polyvalent metal compound particles may be measured by instrumentation and counting through a scanning electron microscope or transmission electron microscope when they are dry solids. The average particle diameter of the polyvalent metal compound particles in the coating liquid can be measured by a light scattering method [reference: "Engineering System of Fine Particles", Vol. 1, pp. 362-366, Fuji Technosystem (2001)]. The polyvalent metal compound particles are present in the form of primary particles, secondary particles or a mixture thereof. In many cases, however, it seems that the particles are present as secondary particles in view of the average particle diameter.

4. Binder Resin:

As examples of the binder resin used in the present invention, may be mentioned general-purpose binder resins for paints, such as alkyd resins, melamine resins, acrylic resins, nitrocellulose, urethane resins, polyester resins, phenol resins, amino resins, fluorocarbon resins and epoxy resins. These resins are resins containing no carboxyl group reacting with the polyvalent metal compound. These binder resins may be used singly. However, they are often used in combination with a hardening agent.

5. Surfactant:

In the present invention, a surfactant is used for the purpose of improving the dispersibility of the polyvalent metal compound particles. The surfactant is a compound having both hydrophilic group and lipophilic group in its molecule. Surfactants include anionic, cationic and amphoteric ionic surfactants and nonionic surfactants. In the present invention, any surfactant may also be used.

Examples of the anionic surfactants include those of the carboxylic acid type, sulfonic acid type, sulfate type and phosphate type. Examples of the carboxylic acid type include aliphatic monocarboxylic acid salts, polyoxyethylene alkyl ether carboxylic acid salts, N-acylsarcosinic acid salts and N-acylglutamic acid salts. Examples of the sulfonic acid type include dialkylsulfosuccinic acid salts, alkanesulfonic acid salts, α-olefinsulfonic acid salts, linear alkylbenzenesulfonic acid salts, (branched) alkylbenzenesulfonic acid salts, naphthalenesulfinic acid salt-formaldehyde condensates, alkyl-naphthalenesulfonic acid salts and N-methyl-N-acyltaurinic acid salts. Examples of the sulfate type include alkyl sulfate salts, polyoxyethylene alkyl ether sulfate salts and fat sulfate salts. Examples of phosphate type include alkylphosphoric acid salts, polyoxyethylene alkyl ether phosphate salts and polyoxyethylene alkyl phenyl ether phosphate salts.

Examples of the cationic surfactants include those of the alkylamine salt type and quaternary ammonium salt type. Examples of the alkylamine salt type include monoalkylamine salts, dialkylamine salts and trialkylamine salts. Examples of the quaternary ammonium salt type include alkyltrimethylammonium halides (chlorides, bromides and iodides) and alkylbenzalkonium chlorides.

Examples of the amphoteric surfactants include those of the carboxybetaine type, 2-alkylimidazoline derivative type, glycine type and amine oxide type. Examples of the carboxybetaine type include alkylbetaines and fatty acid amidopropylbetaines. Examples of the 2-alkylimidazoline derivative type include 2-alkyl-N-carboxymethyl-N-hydroxyethylimidazolinium betaines. Example of the glycine type include alkyl- or dialkyl-diethylenetriaminoacetic acids. Examples of the amine oxide type include alkylamine oxides.

Examples of the nonionic surfactants include those of the ester type, ether type, ester ether type and alkanolamide type. Examples of the ester type include glycerol fatty acid esters, sorbitan fatty acid esters and sucrose fatty acid esters. Examples of the ether type include polyoxyethylene alkyl ethers, polyoxyethylene alkyl phenyl ethers and polyoxyethylene polyoxypropylene glycol. Examples of the ester ether type include fatty acid polyethylene glycol and fatty acid polyoxyethylene sorbitan. Examples of the alkanolamide type include fatty acid alkanolamides.

Surfactants having a polymer skeleton, such as styrene-acrylic acid copolymers may also be used.

Among these surfactants, the anionic surfactants such as phosphates and surfactants having a polymer skeleton, such as styrene-acrylic acid copolymers are preferred.

6. Laminate and Production Process Thereof:

The laminate according to the present invention is a laminate having a layer structure that at least one carboxyl group-containing polymer layer (A) and at least one polyvalent metal compound-containing layer (B) are arranged adjacently to each other on at least one side of a polymeric base. The carboxyl group-containing polymer layer (A) and the polyvalent metal compound-containing layer (B) are formed on one side or both sides of the polymeric base. In many cases, a laminate having desired gas barrier property can be obtained by forming these layers on only one side.

Fundamental layer structures of the laminate according to the present invention are as follows: (i) Polymeric base/carboxyl group-containing polymer layer (A)/polyvalent metal compound-containing layer (B), (ii) Polymeric base/polyvalent metal compound-containing layer (B)/carboxyl group-containing polymer layer (A)/polyvalent metal compound-containing layer (B), and (iii) Polymeric base/carboxyl group-containing polymer layer (A)/polyvalent metal compound-containing layer (B)/carboxyl group-containing polymer layer (A).

In addition to the above-described fundamental layer structures, at least one another resin layer may be arranged on one side or both sides of the laminate. No particular limitation is imposed on a process for arranging other resin layers. For example, a lamination method or coating method may be adopted. As the other resin layers, may be mentioned layers of the resins used as the base. However, the layers are not limited thereto, and various resin layers that can impart desired properties such as heat sealability, abrasion resistance and heat resistance may be arranged. Further, one or more metal layers or inorganic oxide layers formed of a metal foil, silicon oxide or the like may be formed on the laminate according to the present invention by a lamination method or vapor deposition method.

No particular limitation is imposed on the thickness of the polymeric base, and the thickness may be suitably set according to uses of the resulting laminate. When the laminate according to the present invention is used as a multi-layer film, the thickness of the polymeric base is within a range of generally 1 μm to 1 mm, preferably 3 to 500 μm, more preferably 5 to 100 μm. No particular limitation is imposed on the thickness of the carboxyl group-containing polymer layer (A). However, it is within a range of generally 0.001 μm to 1 mm, preferably 0.01 to 100 μm, more preferably 0.1 to 10 μm, particularly preferably 0.5 to 5 μm from the viewpoints of forming ability upon the formation of a film (coating film) and handling property of the resulting multi-layer film. The thickness of the polyvalent metal compound-containing layer (B) is within a range of generally 0.001 μm to 1 mm, preferably 0.01 to 100 μm, more preferably 0.1 to 10 μm.

In order to produce the laminate according to the present invention, a coating liquid comprising the carboxyl group-containing polymer is used and applied on to the polymeric base or a polyvalent metal compound-containing layer formed on the polymeric base, and dried to form a coating film. In order to form the polyvalent metal compound-containing layer, a coating liquid comprising the polyvalent metal compound, binder resin and surfactant is used and applied on to the polymeric base or the carboxyl group-containing polymer layer formed on the polymeric base, and dried to form a coating film.

More specifically, the laminate can be produced by a process comprising (1) Step 1 of applying the coating liquid comprising the carboxyl group-containing polymer on to at least one side of the polymeric base to dry it, thereby forming the carboxyl group-containing polymer layer (A) and (2) Step 2 of applying the coating liquid comprising particles of the polyvalent metal compound, the binder resin and the surfactant before or after Step 1 to dry it, thereby forming the polyvalent metal compound-containing layer (B). Step 1 and Step 2 can be carried out successively several times as needed.

The coating liquid comprising the carboxyl group-containing polymer is prepared by using a solvent that can uniformly dissolve or disperse the carboxyl group-containing polymer therein. As examples of the solvent, may be mentioned water; alcohols such as methyl alcohol, ethyl alcohol and isopropyl alcohol; and polar organic solvents such as N,N-dimethyl sulfoxide, N,N-dimethylformamide and dimethylacetamide.

No particular limitation is imposed on the concentration of the carboxyl group-containing polymer in the coating liquid comprising the carboxyl group-containing polymer and the solvent. However, it is desirable that the concentration be within a range of preferably 0.1 to 60% by weight, more preferably 0.5 to 25% by weight, particularly preferably 1 to 10% by weight from the viewpoints of the stability, uniformly-coating ability and easy coating operation of the coating liquid. The above-described crosslinking agent may be contained in the coating liquid comprising the carboxyl group-containing polymer.

Into the coating liquid comprising the carboxyl group-containing polymer, additive components such as other polymers, softening agents, stabilizers, anti-blocking agents, pressure-sensitive adhesives, inorganic lamellar compounds typified by montmorillonite, colorants and ultraviolet absorbents may be suitably added within limits not impeding the gas barrier property as needed. It is desirable that the amount added be preferably at most 5% by weight, more preferably at most 3% by weight, particularly preferably at most 1% by weight in terms of the total amount of the additives based on the weight of the carboxyl group-containing polymer.

The coating liquid comprising the polyvalent metal compound can be prepared by dissolving or dispersing the polyvalent metal compound particles, binder resin and surfactant in a solvent. No particular limitation is imposed on the solvent so far as it can uniformly dissolve or disperse these components therein. As specific examples thereof, may be mentioned water; alcohols such as methyl alcohol, ethyl alcohol, isopropyl alcohol, n-propyl alcohol, n-butyl alcohol and n-pentyl alcohol; ketones such as acetone and methyl ethyl ketone; ethers such as diethyl ether, dioxane and tetrahydrofuran; esters such as ethyl acetate and butyl acetate; polar organic solvents such as dimethyl sulfoxide, N,N-dimethylacetamide, N,N-dimethyl-formamide, N-methyl-2-pyrrolidone, tetramethylurea, hexamethylphosphoric triamide and γ-butyrolactone; and hydrocarbons such as toluene, hexane, heptane and cyclohexane. These solvents may be used either singly or in any combination thereof.

Into the coating liquid comprising the polyvalent metal compound, additives such as softening agents, stabilizers, film-forming agents, anti-blocking agents and pressure-sensitive adhesives may be suitably added in proper amounts as needed.

A mixing ratio (mass ratio) of the polyvalent metal compound particles to the binder resin is within a range of generally 99:1 to 1:99, preferably 85:15 to 20:80. If the proportion of the binder resin is too low, the resulting polyvalent metal compound-containing layer shows a tendency to lower its interlayer adhesive property with the carboxyl group-containing polymer layer. A mixing ratio (mass ratio) of the surfactant to the polyvalent metal compound particles is generally within a range of 0.1:99.9 to 50:50.

The content of the polyvalent metal compound particles in the coating liquid is within a range of generally 0.05 to 50% by weight, preferably 0.05 to 30% by weight, more preferably 0.1 to 30% by weight. The content of the binder resin in the coating liquid is within a range of generally 0.05 to 50% by weight, preferably 0.05 to 30% by weight, more preferably 0.1 to 30% by weight.

The surfactant is used in an amount sufficient to stably disperse the polyvalent metal compound particles. It is however desirable that the surfactant be contained in a proportion of generally 0.0001 to 50% by weight, preferably 0.001 to 20% by weight, more preferably 0.1 to 10% by weight based on the total weight of the coating liquid. When no surfactant is added, it is difficult to disperse the polyvalent metal compound particles in the coating liquid in such a manner that the average particle diameter of the particles becomes sufficiently small. As a result, it is difficult to provide a coating liquid, in which the polyvalent metal compound particles are uniformly dispersed, so that it is difficult to form a coating film having an even film thickness when the coating liquid is applied on to the base or the carboxyl group-containing polymer layer.

With respect to the coating liquid comprising the polyvalent metal compound, it is preferable that the total concentration of other components than the solvent falls within a range of preferably 0.1 to 60% by weight, more preferably 0.5 to 50% by weight, particularly preferably 1 to 30% by weight in that a coating film having a desired film thickness is obtained with good operating efficiency.

A proportion of the polyvalent metal compound particles to the carboxyl group-containing polymer is preferably a proportion that a chemical equivalent of the total (Bt) of the polyvalent metal compound particles to the total (At) of the carboxyl group in the carboxyl group-containing polymer amounts to at least 0.6. This chemical equivalent is more preferably at least 0.8, particularly preferably at least 1.0. The upper limit of the chemical equivalent is generally 10.0, preferably 5.0, more preferably 2.0. If the chemical equivalent of the polyvalent metal compound particles to the carboxyl group in the carboxyl group-containing polymer is too low, the carboxyl group-containing polymer layer (film) shows a tendency to lower its various properties such as gas barrier property, hot water resistance and water vapor resistance.

The total of the carboxyl group also includes other forms such as a carboxyl group converted into a polyvalent metal carboxylate, in addition to a free carboxyl group. Likewise, the total of the polyvalent metal compound also includes that converted into a polyvalent metal carboxylate. These calculations are made on all layers of the multi-layer structure.

The chemical equivalent can be determined, for example, in the following manner. Description is given herein taking, as an example, the case where the carboxyl group-containing polymer is polyacrylic acid, and the polyvalent metal compound is magnesium oxide. When the mass of polyacrylic acid is 100 g, the amount of a carboxyl group in 100 g of polyacrylic acid is 1.39 mol, since the molecular weight of monomer unit of polyacrylic acid is 72, and one carboxyl group is contained in a molecule of the monomer. At this time, 1.0 chemical equivalent to 100 g of polyacrylic acid means an amount of a base required to neutralize 1.39 mol of the carboxyl group. When magnesium oxide is mixed in a proportion of 0.6 chemical equivalent with 100 g of polyacrylic acid, it is only necessary to add magnesium oxide in an amount required to neutralize 0.834 mol of the carboxyl group. since the valence of magnesium is 2, and the molecular weight of magnesium oxide is 40, the 0.6 chemical equivalent of magnesium oxide to 100 g of polyacrylic acid is 16.68 g (0.417 mol).

Figure 2:
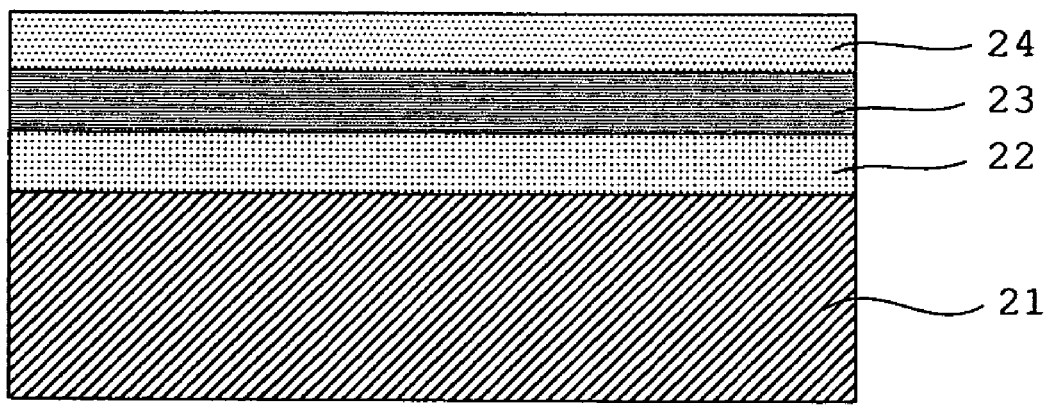
FIG. 2 is a cross-sectional view illustrating another exemplary layer structure of a multi-layer film.

The respective coating liquids are applied on to the base in such a manner that at least one carboxyl group-containing polymer layer (A) and at least one polyvalent metal compound-containing layer (B) are arranged adjacently to each other, and are dried. In this case, a process, in which one coating liquid is applied and dried, and the other coating liquid is then applied thereto and dried, is adopted. As a layer structure, may be adopted any of the above-described layer structures. As preferable layer structures including a base layer, for example, when the base layer, the carboxyl group-containing polymer layer and the polyvalent metal compound-containing layer are indicated as "Base", A and B, respectively, specific examples of multi-layer structures include "Base/A/B" (Base 1/Carboxyl group-containing polymer layer 2/Polyvalent metal compound-containing layer 3) illustrated in FIG. 1, "Base/B/A/B" (Base 21/Polyvalent metal compound-containing layer 22/Carboxyl group-containing polymer layer 23/Polyvalent metal compound-containing layer 24) illustrated in FIG. 2, and "Base/A/B/A". Of course, A and B may also be arranged alternately and repeatedly in such a manner that still more layers are formed. An adhesive layer may also be arranged for the purpose of improving adhesion between the base and a coating film formed thereon.

As a method for applying the respective coating liquids, may be adopted any of a spraying method, a dipping method, a coating method using a coater and a printing method by a printing machine. When the coating liquids are applied by means of a coater or printing machine, various systems such as a gravure coater of the direct gravure system, reverse gravure system, kiss gravure system, offset gravure system or the like; a reverse-roll coater, a micro-gravure coater, an airknife coater, a dip coater, a bar coater, a comma coater, and a die coater may be adopted.

No particular limitation is imposed on a drying method for the coating film, and any method may be used so far as the solvent can be evaporated to obtain a solid layer. Examples thereof include a method by air drying under an atmospheric environment, a method by drying in an oven set to a prescribed temperature, and a method making use of any other drying means. As other drying means, dryers attached to various kinds of coaters, such as an arch dryer, a floating dryer, a drum dryer and an infrared dryer are representative. Drying conditions may be optionally set within limits not damaging the coating film, film, base and the like by heat. The drying is continued until the solvent in the coating film is substantially removed. When the carboxyl group-containing polymer layer (A) contains a crosslinking agent, a heat treatment for introducing a crosslinked structure such as an ester bond is conducted in addition to the removal of the solvent by the drying.

After the respective layers are formed on the polymeric base, the polyvalent metal compound particles are caused to migrate from the polyvalent metal compound-containing layer (B) into the carboxyl group-containing polymer layer (A) adjoining it to form a polyvalent metal salt of the carboxyl group-containing polymer, thereby forming the polyvalent metal salt of the carboxyl group-containing polymer in the carboxyl group-containing polymer layer (A). The migration of the polyvalent metal compound particles includes migration in the form of a polyvalent metal ion.

The migration of the polyvalent metal particles may be conducted by leaving the multi-layer film having the carboxyl group-containing polymer layer (A) and polyvalent metal compound-containing layer (B) to stand for a long period of time under ordinary temperature and ordinary humidity. In order to accelerate the migration of the polyvalent metal particles and impart a desired level of gas barrier property (oxygen gas transmission rate or oxygen gas transmission coefficient) prior to secondary forming process of the multilayer film, however, it is desirable to conduct a heat treatment or aging (humidity conditioning treatment) under an atmosphere controlled to prescribed humidity and temperature.

As an aging method, is mentioned a method in which the multi-layer film is left to stand under an atmosphere of a relative humidity of generally at least 20%, preferably 40 to 100%, more preferably 60 to 100% and a temperature of generally 5° C. to 200° C., preferably 20° C. to 150° C., more preferably 30° C. to 130° C. The aging is conducted in a gas phase or liquid phase controlled to the above-described conditions.

Aging time is suitably controlled according to the relative humidity and temperature and is up to the time the desired gas barrier property is achieved. However, the aging time is preferably within 10 days, more preferably within 5 days, still more preferably within 2 days. The pressure upon the aging may be suitably selected from a range of 0.001 MPa (0.01 atm) to 1,000 MPa (10,000 atm).

The laminate according to the present invention is excellent in migration property of the polyvalent metal compound particles from the polyvalent metal compound-containing layer (B), so that the carboxyl group-containing polymer in the carboxyl group-containing polymer layer (A) is subjected to ionic bonding (ionic crosslinking) by the polyvalent metal ion, whereby the laminate can be provided as a laminate having a coating film (film) excellent in gas barrier property, water resistance, hot water resistance and water vapor resistance. The adhesion between the polyvalent metal compound-containing layer (B) and the carboxyl group-containing polymer layer (A) is improved by the presence of the binder resin. The migration of the polyvalent metal compound particles is accelerated by the presence of the surfactant. The carboxyl group-containing polymer layer (A) is ionically crosslinked, whereby a laminate, to which high hot water resistance and water vapor resistance that its shape is retained even in hot water and water vapor are imparted, and which exhibits excellent gas barrier property even under high-humidity conditions, can be obtained.

The laminate according to the present invention desirably has gas barrier property that the oxygen transmission rate thereof is preferably at most 1,000 cm$^3$(STP)/(m$^2$·day·MPa), more preferably at most 500 cm$^3$(STP)/(m$^2$·day·MPa), particularly preferably at most 100 cm$^3$ (STP)/(m$^2$·day·MPa) even under both conditions of a temperature of 30° C. and a relative humidity of 0%, and a temperature of 30° C. and a relative humidity of 80%.

The laminates according to the present invention are often used as multi-layer films containing the polymeric base. On the laminates according to the present invention, one or more other resin layers may be arranged by a lamination method or coating method as needed. The laminates according to the present invention are suitable for use as packaging materials for foods, drinks, drugs, medicines, electronic parts, etc. that tend to undergo deterioration by oxygen. The laminates according to the present invention are suitable for use as materials for packaging containers such as bottles, cups, trays, tubes and bags. Secondary forming and processing into such containers may be optionally conducted by heat sealing, sheet forming (vacuum forming and/or pressure forming) and/or the like.

EXAMPLES

The present invention will hereinafter be described more specifically by the following Examples and Comparative Examples. Measuring and evaluating methods of physical properties in the present invention are as follows.

(1) Oxygen Transmission Rate:

An oxygen transmission rate of a film was measured under conditions of a temperature of 30° C. and a relative humidity of 0% by means of an oxygen transmission tester (OXTRAN 2/20 manufactured by Modern Control Co.). The unit of the measured value is cm$^3$/(m$^2$·day·MPa).

Preparation Example 1

Coating Liquid I

An aqueous solution of polyacrylic acid (product of Toagosei Chemical Industry Co., Ltd., trade name "Aron A-10H", concentration: 25% by weight, number average molecular weight: 200,000) was diluted with water and isopropanol (IPA) to prepare a 5% by weight solution (Coating Liquid I) of polyacrylic acid (PAA). A solvent composition of this Coating Liquid I was water/IPA=50/50 (weight ratio).

Preparation Example 2

Coating Liquid II

An aqueous solution of polyacrylic acid (product of Toagosei Chemical Industry Co., Ltd., trade name "Aron A-10H", concentration: 25% by weight, number average molecular weight: 200,000) was diluted with IPA to prepare a 5% by weight solution of PAA. Further, sodium hydroxide was added in a proportion of 10 mol % to the number of moles of acrylic acid units of PAA contained in this solution and dissolved in the solution to prepare a solution (Coating Liquid II) of a partially neutralized product of PAA, in which 10 mol % of the acrylic acid units were neutralized. A solvent composition of this Coating Liquid II was water/IPA=90/10 (weight ratio).

Preparation Example 3

Coating Liquid III

Polyacrylic acid powder (reagent produced by Aldrich Co., Ltd., number average molecular weight: 450,000) was dissolved in IPA under heat to prepare a 5% by weight solution (Coating Liquid III) of PAA. A solvent composition of this Coating Liquid III was such that IPA was 99% by weight or higher.

Preparation Example 4

Coating Liquid IV

Glycerol was added as a crosslinking agent to Coating Liquid II prepared in Preparation Example 2 to prepare Coating Liquid IV. A ratio of the partially neutralized product of PAA to glycerol in Coating Liquid IV was 60/40 (weight ratio).

Preparation Example 5

Coating Liquid V

Finely particulate calcium carbonate (product of Shiraishi Kogyo Kaisha, Ltd., HAKUENKA O, average particle diameter: 40 nm) was used as polyvalent metal compound particles. A solution of a urethane resin (product of Dainichiseika Color & Chemicals Mfg. Co., Ltd., trade name "Medium NT Hilamic for Ink"; solvent: ethyl acetate/propyl acetate/methyl ethyl ketone/IPA) was used as a resin. A solution of an isocyanate compound (product of Dainichiseika Color & Chemicals Mfg. Co., Ltd., trade name "Lamic B Hardener"; solvent: toluene/methyl ethyl ketone/ethyl acetate) was used as a hardener for the resin. Sorbitan monostearate was used as a surfactant. These components were mixed so as to give the following composition, and the resultant mixture was finally mixed by means of an ultrasonic homogenizer to prepare Coating Liquid V.

| | |
|---|---|
| Calcium carbonate: | 1,000 g |
| Urethane resin (solid content): | 500 g |
| Sorbitan monostearate: | 200 g |
| Hardener (solid content) | 60 g |
| Solvent: | 3,200 g. |

The solvent is a mixed solvent of toluene/methyl ethyl ketone/ethyl acetate/IPA. A weight ratio of calcium carbonate to the urethane resin is 67/33, and a weight ratio of calcium carbonate to the surfactant is 84/16.

Preparation Example 6

Coating Liquid VI

Finely particulate calcium carbonate (product of Shiraishi Kogyo Kaisha, Ltd., HAKUENKA O, average particle diameter: 40 nm) was used as polyvalent metal compound particles. A solution of a polyester resin (product of Mitsui Takeda Chemicals, Inc., trade name "Takelac A-525"; solvent: ethyl acetate) used as an adhesive for dry lamination was used as a resin. A solution of an isocyanate compound (product of Mitsui Takeda Chemicals, Inc., trade name "Takenate A52"; solvent: ethyl acetate) was used as a hardener for the resin. A styrene-acrylic acid copolymer (product of Dainichiseika Color & Chemicals Mfg. Co., Ltd.) was used as a surfactant. These components were mixed so as to give the following composition, and the resultant mixture was finally mixed by means of an ultrasonic homogenizer to prepare Coating Liquid VI.

| | |
|---|---|
| Calcium carbonate: | 1,000 g |
| Polyester resin (solid content): | 1,000 g |
| Styrene-acrylic acid copolymer: | 1,000 g |
| Hardener (solid content) | 80 g |
| Ethyl acetate: | 6,000 g. |

A weight ratio of calcium carbonate to the polyester resin is 50/50, and a weight ratio of calcium carbonate to the surfactant is 50/50.

Preparation Example 7

Coating Liquid VII

Finely particulate zinc oxide (product of C.I. Kasei Company, Ltd., trade name "Ultrafine Particle Zinc Oxide Nanotec", average particle diameter: 20 nm) was used as polyvalent metal compound particles. A solution of a polyester-urethane resin (product of Sumika Bayer Urethane Co., Ltd., aqueous dispersion of polyester-urethane, trade name "Bayhydrol PR240"; solvent: water) was used as a resin. A phosphate salt type surfactant produced by Marubishi Oil Chemical Co., Ltd. was used as a surfactant. These components were mixed so as to give the following composition, and the resultant mixture was finally mixed by means of an ultrasonic homogenizer to prepare Coating Liquid VII.

| | |
|---|---|
| Zinc oxide: | 1,000 g |
| Polyester-urethane resin (solid content): | 500 g |
| Phosphate salt type surfactant: | 100 g |
| Water: | 3,400 g. |

A weight ratio of zinc oxide to the polyester-urethane resin is 67/33, and a weight ratio of zinc oxide to the surfactant is 91/9.

Preparation Example 8

Coating Liquid VIII

Coating Liquid VIII was prepared in the same manner as in Preparation Example 5 except that sorbitan monostearate of the surfactant was not added in Coating Liquid V.

Preparation Example 9

Coating Liquid IX

Coating Liquid IX was prepared in the same manner as in Preparation Example 6 except that the styrene-acrylic acid copolymer of the surfactant was not added in Coating Liquid VI.

Preparation Example 10

Coating Liquid X

Coating Liquid X was prepared in the same manner as in Preparation Example 7 except that the phosphate salt type surfactant of the surfactant was not added in Coating Liquid VII.

Example 1

Coating Liquid I was applied on to a biaxially oriented polyester film (PET film; product of Toray Industries, Inc., trade name "Lumirror P60", thickness: 12 μm) by means of a gravure coater and dried (dry coating thickness: 1 μm). Coating Liquid V was further applied on to the coating film by means of the gravure coater and dried (dry coating thickness: 1 μm).

The multi-layer film obtained in such a manner was left at rest for 24 hours in a thermohygrostat controlled to an atmosphere of a temperature of 30° C. and a relative humidity of 80% to cause a metal ion to migrate into the PAA film, thereby forming a metal salt of PAA by a solid phase reaction. An oxygen transmission rate of the resultant multi-layer film was measured. The result is shown in Table 1.

Example 2

A multi-layer film was produced in the same manner as in Example 1 except that Coating Liquid II was used in place of Coating Liquid I, and its oxygen transmission rate was measured. The dry coating thicknesses of the respective coating films were both 1 μm.

Example 3

A multi-layer film was produced in the same manner as in Example 1 except that Coating Liquid III was used in place of Coating Liquid I, and its oxygen transmission rate was measured. The dry coating thicknesses of the respective coating films were both 1 μm.

Example 4

Coating Liquid IV was applied on to a PET film (product of Toray Industries, Inc., trade name "Lumirror P60", thickness: 12 μm) by means of a gravure coater and dried (dry coating thickness: 1 μm). The film after the drying was heat-treated under conditions of 200° C. for 15 minutes in an oven, whereby a crosslinking reaction was carried out between PAA and glycerol. Coating Liquid V was applied on to the coating film thus obtained by means of the gravure coater like Example 1 and dried (dry coating thickness: 1 μm). An oxygen transmission rate of the resultant multi-layer film was measured. The result is shown in Table 1.

Example 5

A multi-layer film was produced in the same manner as in Example 1 except that Coating Liquid VI was used in place of Coating Liquid V, and its oxygen transmission rate was measured. The dry coating thicknesses of the respective coating films were both 1 μm.

Example 6

A multi-layer film was produced in the same manner as in Example 1 except that Coating Liquid VII was used in place of Coating Liquid V, and its oxygen transmission rate was measured. The dry coating thicknesses of the respective coating films were both 1 μm.

Example 7

A multi-layer film was produced in the same manner as in Example 1 except that a biaxially oriented nylon 6 film (ONy film; product of Unichika, Ltd., trade name "EMBLEM ONBC", thickness: 15 μm) was used in place of the PET film, and its oxygen transmission rate was evaluated. The result is shown in Table 1.

Example 8

A multi-layer film was produced in the same manner as in Example 1 except that a biaxially oriented polypropylene film (OPP film; product of Futamura Chemical Industries Co., Ltd., trade name "TAIKO FOR", thickness: 20 μm) was used in place of the PET film, and its oxygen transmission rate was evaluated. The result is shown in Table 1.

Example 9

A multi-layer film was produced in the same manner as in Example 1 except that an unoriented polypropylene film (CPP film; product of Toray Gosei Co., Ltd., trade name "TORAYFAN NO, ZK93FM", thickness: 60 μm) was used in place of the PET film, and its oxygen transmission rate was evaluated. The result is shown in Table 1.

Example 10

A multi-layer film was produced in the same manner as in Example 1 except that an unoriented linear low density polyethylene film (LLDPE film; product of Tohcello Co., Ltd., trade name "TUX-TCS", thickness: 50 μm) was used in place of the PET film, and its oxygen transmission rate was evaluated. The result is shown in Table 1.

Example 11

A multi-layer film was produced in the same manner as in Example 1 except that a silicon oxide-deposited PET film (product of Oike Kogyo Co., Ltd., trade name "MOS-TR", thickness: 12 μm) was used in place of the PET film, and its oxygen transmission rate was evaluated. Coating Liquid I was applied on to the surface deposited with silicon oxide. The result is shown in Table 1.

Example 12

A multi-layer film was produced in the same manner as in Example 11 except that Coating Liquid I was applied on to a surface (back surface) opposite to the surface deposited with silicon oxide in the silicon oxide-deposited PET film, and its oxygen transmission rate was evaluated. The result is shown in Table 1.

Example 13

An adhesive (adhesive for dry lamination produced by Mitsui Takeda Chemicals, Inc., trade name "Takelac A-525"; hardener: Takenate A-52) was applied on to a PET film (product of Toray Industries, Inc., trade name "Lumirror P60", thickness: 12 μm) by means of a gravure coater and dried (dry coating thickness: 0.5 μm). Coating Liquid I was applied on to the coating film thus obtained by means of the gravure coater and dried (dry coating thickness: 1 μm). Further, Coating Liquid V was applied on to the coating film thus obtained by means of the gravure coater and dried (dry coating thickness: 1 μm). An oxygen transmission rate of the resultant multi-layer film was measured. The result is shown in Table 1.

Example 14

Coating Liquid V was applied on to a PET film (product of Toray Industries, Inc., trade name "Lumirror P60", thickness: 12 μm) and dried (dry coating thickness: 0.5 μm). Coating Liquid I was applied on to the coating film by means of a gravure coater and dried (dry coating thickness: 1 μm). Further, Coating Liquid V was applied thereto by means of the gravure coater and dried (dry coating thickness: 0.5 μm). An oxygen transmission rate of the resultant multi-layer film was measured. The result is shown in Table 1.

Comparative Example 1

A multi-layer film was produced in the same manner as in Example 1 except that Coating Liquid VIII containing no surfactant was used in place of Coating Liquid V, and its oxygen transmission rate of the resultant multi-layer film was evaluated. The result is shown in Table 1.

Comparative Example 2

A multi-layer film was produced in the same manner as in Example 1 except that Coating Liquid IX containing no surfactant was used in place of Coating Liquid V, and its oxygen transmission rate of the resultant multi-layer film was evaluated. The result is shown in Table 1.

Comparative Example 3

A multi-layer film was produced in the same manner as in Example 1 except that Coating Liquid X containing no surfactant was used in place of Coating Liquid V, and its oxygen transmission rate of the resultant multi-layer film was evaluated. The result is shown in Table 1.

TABLE 1

| | Carboxyl group-containing polymer layer | | Polyvalent metal compound-containing layer | | | | Oxygen transmission | |
|---|---|---|---|---|---|---|---|---|
| | Coating Liquid | Thickness (μm) | Coating liquid | Thickness (μm) | Base film | Layer structure | rate ($cm^3/m^2 \cdot day \cdot MPa$) (30° C., 80% RH) | Note |
| Ex. 1 | I | 1.0 | V | 1.0 | PET | I/V | 10 | |
| Ex. 2 | II | 1.0 | V | 1.0 | PET | II/V | 10 | |

TABLE 1-continued

| | Carboxyl group-containing polymer layer | | Polyvalent metal compound-containing layer | | | | Oxygen transmission rate (cm³/m² · day · MPa) (30° C., 80% RH) | |
|---|---|---|---|---|---|---|---|---|
| | Coating Liquid | Thickness (μm) | Coating liquid | Thickness (μm) | Base film | Layer structure | | Note |
| Ex. 3 | III | 1.0 | V | 1.0 | PET | III/V | 10 | |
| Ex. 4 | IV | 1.0 | V | 1.0 | PET | IV/V | 10 | Heat treatment |
| Ex. 5 | I | 1.0 | VI | 1.0 | PET | I/VI | 10 | |
| Ex. 6 | I | 1.0 | VII | 1.0 | PET | I/VII | 10 | |
| Ex. 7 | I | 1.0 | V | 1.0 | ONy | I/V | 10 | |
| Ex. 8 | I | 1.0 | V | 1.0 | OPP | I/V | 10 | |
| Ex. 9 | I | 1.0 | V | 1.0 | CPP | I/V | 10 | |
| Ex. 10 | I | 1.0 | V | 1.0 | LLDPE | I/V | 10 | |
| Ex. 11 | I | 1.0 | V | 1.0 | Silicon oxide-deposited PET | I/V | 10 | Coating on deposited surface |
| Ex. 12 | I | 1.0 | V | 1.0 | | I/V | 10 | Coating on surface opposite to deposited surface |
| Ex. 13 | I | 1.0 | V | 1.0 | PET | Adhesive/I/V | 10 | Having adhesive layer |
| Ex. 14 | I | 1.0 | V | 1.0 | PET | V/I/V | 10 | V/I/V |
| Comp. Ex. 1 | I | 1.0 | VIII | 1.0 | PET | I/VIII | 1,500 | Adding no surfactant |
| Comp. Ex. 2 | I | 1.0 | IX | 1.0 | PET | I/IX | 1,500 | |
| Comp. Ex. 3 | I | 1.0 | X | 1.0 | PET | I/X | 1,500 | |

INDUSTRIAL APPLICABILITY

According to the present invention, there are provided laminates comprising a polymer layer obtained by ionically crosslinking a carboxyl group-containing polymer with a polyvalent metal and having excellent gas barrier property, moisture resistance, water resistance, hot water resistance and water vapor resistance and also having excellent gas barrier property under high-humidity conditions, to say nothing of low-humidity conditions, and a production process thereof.

The laminates according to the present invention are excellent in the migration property of polyvalent metal compound particles from the polyvalent metal compound-containing layer into the carboxyl group-containing polymer layer. The laminates according to the present invention are excellent in gas barrier property, moisture resistance, water resistance, hot water resistance and water vapor resistance by virtue of ionic crosslinking alone by a polyvalent metal even when the carboxyl group-containing polymer layer does not always contain a crosslinking agent component.

The laminates according to the present invention are excellent in gas barrier property, moisture resistance, water resistance, hot water resistance and water vapor resistance and also excellent in gas barrier property under high-humidity conditions, to say nothing of low-humidity conditions. The laminates according to the present invention are suitable for use as, for example, packaging materials making good use of these various properties.

The invention claimed is:

1. A laminate having a layer structure that a carboxyl group-containing polymer layer (A) and a polyvalent metal compound-containing layer (B) are arranged adjacently to each other on at least one side of a polymeric base, wherein the polyvalent metal compound-containing layer (B) contains particles of a polyvalent metal compound, a binder resin and a surfactant, and wherein the laminate has an oxygen transmission rate of no more than 1,000 cm³(STP)/(m²·day·MPa) as measured at 30° C. and 0% relative humidity as well as at 30° C. and 80% relative humidity.

2. The laminate according to claim 1, wherein the carboxyl group-containing polymer layer (A) is ionically crosslinked by a polyvalent metal ion migrated from the polyvalent metal compound-containing layer (B).

3. The laminate according to claim 1, wherein a multi-layer film having a layer structure that the carboxyl group-containing polymer layer (A)/the polyvalent metal compound-containing layer (B), the polyvalent metal compound-containing layer (B)/the carboxyl group-containing polymer layer (A)/the polyvalent metal compound-containing layer (B), or the carboxyl group-containing polymer layer (A)/the polyvalent metal compound-containing layer (B)/the carboxyl group-containing polymer layer (A) are arranged in this order is arranged on at least one side of the polymeric base.

4. The laminate according to claim 1, wherein at least one another resin layer is further arranged on at least one side of the polymeric base in addition to the multi-layer film having the layer structure.

5. The laminate according to claim 1, wherein the polymeric base is a plastic film, and the whole laminate is a multi-layer film.

6. The laminate according to claim 1, wherein a proportion of the polyvalent metal compound particles to the carboxyl group-containing polymer is a proportion that a chemical equivalent of the total (Bt) of the polyvalent metal compound particles to the total (At) of the carboxyl group in the carboxyl group-containing polymer amounts to at least 0.6.

7. The laminate according to claim 1, wherein the carboxyl group-containing polymer is a homopolymer of a carboxyl group-containing unsaturated monomer, a copolymer of carboxyl group-containing unsaturated monomers, a copolymer of a carboxyl group-containing unsaturated monomer and any other polymerizable monomer, a carboxyl group-containing polysaccharide or a mixture thereof.

8. The laminate according to claim 1, wherein the carboxyl group-containing unsaturated monomer is at least one α,β-monoethylenically unsaturated carboxylic acid selected from the group consisting of acrylic acid, methacrylic acid, crotonic acid, itaconic acid, maleic acid and fumaric acid.

9. The laminate according to claim 1, wherein the polyvalent metal compound particles are particles having an average particle diameter of 10 nm to 10 μm.

10. The laminate according to claim 1, wherein the polyvalent metal compound is an oxide, carbonate, organic acid salt or alkoxide of beryllium, magnesium, calcium, copper, cobalt, nickel, zinc, aluminum or zircomum.

11. The laminate according to claim 1, wherein the polyvalent metal compound particles are particles of a divalent metal compound.

12. The laminate according to claim 1, wherein the polyvalent metal compound-containing layer (B) contains the polyvalent metal compound particles and the binder resin in a proportion of 99:1 to 1:99 in terms of a mass ratio.

13. The laminate according to claim 1, wherein the polyvalent metal compound-containing layer (B) contains the polyvalent metal compound particles and the surfactant in a proportion of 99.9:0.1 to 50:50 in terms of a mass ratio.

14. The laminate according to claim 1 wherein the thickness of the carboxyl group-containing polymer layer (A) is 0.001 μm to 1 mm, and the thickness of the polyvalent metal compound-containing layer (B) is 0.00 1 μm to 1 mm.

15. The laminate according to claim 1, which is obtained by a process comprising forming at least one carboxyl group-containing polymer layer (A) and at least one polyvalent metal compound-containing layer (B) adjacently to each other on the polymeric base by a coating method and then aging the formed layers under an atmosphere of a relative humidity of at least 20% and a temperature of 5° C. to 200° C. to cause the polyvalent metal compound to migrate from the polyvalent metal compound-containing layer (B) into the carboxyl group-containing polymer layer (A), thereby forming a polyvalent metal salt with the carboxyl group in the carboxyl group-containing polymer layer.

16. The laminate according to claim 1, wherein the carboxyl group-containing polymer layer (A) comprises
   a) at least one carboxyl group-containing polymer selected from the group consisting of a homopolymer of an α,β-monoethylenically unsaturated carboxylic acid, a copolymer of α,β-monoethylenically unsaturated carboxylic acids, a copolymer of an α,β-monoethylenically unsaturated carboxylic acid and an ethylenically unsaturated monomer, and a partially neutralized product thereof in which a part of the carboxyl group is neutralized with an alkali hydroxide or a volatile base with a degree of neutralization of at most 20%; and
   b) at least one additive component selected from the group consisting of other polymers, softening agents, stabilizers, anti-blocking agents, pressure-sensitive adhesives, inorganic lamellar compounds, colorants and ultraviolet absorbents in the range of at most 1% by weight in terms of the total amount of the additives based on the weight of the carboxyl group-containing polymer.

17. The laminate according to claim 16, wherein the at least one carboxyl group-containing polymer is a polyacrylic acid or a partially neutralized product of a polyacrylic acid.

18. The laminate according to claim 16, wherein the carboxyl group-containing polymer layer (A) further comprises a polyhydric alcohol as a crosslinking agent in which a proportion of the carboxyl group-containing polymer to the polyhydric alcohol is 5:95 to 90:10 in terms of a mass ratio.

19. The laminate according to claim 16, wherein the surfactant is an ester type nonionic surfactant, or an anionic surfactant, or a surfactant having a polymer skeleton.

20. The laminate according to claim 1, wherein the laminate has an oxygen transmission rate of no more than 500 $cm^3(STP)/(m^2 \cdot day \cdot MPa)$ as measured at 30° C. and 0% relative humidity as well as at 30° C. and 80% relative humidity.

21. The laminate according to claim 1, wherein the laminate has an oxygen transmission rate of no more than 100 $cm^3(STP)/(m^2 \cdot day \cdot MPa)$ as measured at 30° C. and 0% relative humidity as well as at 30° C. and 80% relative humidity.

* * * * *